PREPARE FINELY DIVIDED MASS CONTAINING:

| | % BY WEIGHT |
|---|---|
| UREA-FORMALDEHYDE COMPOUND | 0 - 100 |
| PHOSPHORUS-CONTAINING COMPOUND | 0 - 100 |
| BINDING AGENT | 0 - 5 |

↓

COMPRESS

↓

UNITARY FERTILIZER PRODUCT
WEIGHING 1 - 30 GRAMS

↓

APPLY PRODUCT BELOW SOIL SURFACE
ADJACENT THE ROOTS OF YOUNG PLANT
AT THE TIME OF TRANSPLANTING

*INVENTORS.*
RAYMOND C. AUSTIN
ROBERT F. STRAND
BY
J. R. Segree
AGENT

United States Patent Office 3,024,098
Patented Mar. 6, 1962

3,024,098
FERTILIZER PRODUCT, ITS MANUFACTURE
AND APPLICATION
Raymond C. Austin and Robert F. Strand, Camas, Wash., assignors to Crown Zellerbach Corporation, San Francisco, Calif., a corporation of Nevada
Filed Oct. 6, 1958, Ser. No. 765,628
10 Claims. (Cl. 71—29)

This invention relates to fertilizer products adapted for use in forest fertilization. More particularly, this invention relates to the manufacture of novel unitary fertilizer products which may be easily and economically applied to newly planted trees and other plants to significantly enhance their survival, early growth, and general health.

Although the present invention is directed to fertilizer products suitable for use in conjunction with various types of young plants, the following description will refer specifically to their adaptation in promoting survival, health and growth of transplanted young forest trees.

In the field of forest management, a major problem continually being faced is that of quickly establishing a new and healthy crop of growing trees as soon as the old crop has been removed. Three methods of accomplishing this objective are currently in use: (1) natural seedfall from nearby mature trees, (2) scattering seed by hand or from an aircraft, and (3) transplanting small trees from nursery beds to the spots where they are to grow and mature. This invention is concerned with the latter method.

The common procedure of transplanting young forest trees is to set them into the soil without application of fertilizers or any chemicals to offset transplanting shock. The trees to be transplanted are removed from nursery beds, where favorable growing conditions exist and packaged, bare root, in bundles of about 50 to 100 trees each. Moistened peat moss, cedar tow, sawdust or similar materials protect the tree roots from drying during storage or transportation to tree farm locations. These young trees may at times remain in storage for several weeks before planting. The planting technique is to open a slot in the soil about 4 inches wide and 6 to 8 inches deep, with a flat bladed tool either of a hoe design or a straight bar with flattened end. The roots of the tree seedling are then inserted into this slot as smoothly as possible and without folding, so as to get an even distribution of the roots. The heel of the shoe is then jammed against and into the soil at one edge of the slot to press it firmly around the roots.

Numerous attempts have been made in the past using a variety of fertilizers to improve tree growth. As is well known, commercial fertilizers are available in forms generally referred to as powdered, pelleted or granulated. Such fertilizers are free-flowing and their particles are very small, each weighing but a small fraction of a gram.

Highly-soluble inorganic fertilizers having large amounts of nutrients readily available have been found not quite satisfactory, since care must be taken to avoid placing them too near to the tree roots because of the danger of localized toxic concentrations seriously injuring the plant. Mixing such fertilizers with soil or careful placement are the only ways to overcome this hazard. The organic fertilizers containing a much lower concentration of nutrient elements than the inorganic fertilizers, are characterized by low solubility and by being nontoxic when placed adjacent to the tree roots. Comparatively large volumes of organic fertilizers must be handled in order to supply adequate amount of nutrients to the plant. When commercial blends of inorganic and organic fertilizers are applied to the soil, a rapid dissipation of the highly soluble portion occurs and precautions still must be taken to avoid burning of the plants. Spreading fertilizers on the soil surface around the seedlings has revealed several disadvantages. Such procedure is not only uneconomical and time consuming, but nutrients do not readily penetrate the soil to the rooting region where they are needed, and other vegetation tends to use the material and give critical competition to the seedling. Because of the above mentioned disadvantages, impracticability of application and high cost of labor involved, fertilization of tree seedlings as they are planted in forests is not being practiced on a commercial scale at the present time.

From the foregoing, it will be obvious that an improved and commercially feasible process of application of fertilizers to young forest plants would be of great importance and value in increasing our forest production.

It is, therefore, an object of this invention to provide a novel fertilizer product especially adapted for use in conjunction with transplanting of young forest trees and to a process of manufacturing the same.

It is another object of this invention to provide an improved process of fertilizing forest soil, whereby a fertilizer product of the present invention is placed below the soil surface adjacent the roots of a young plant at the time of planting thereof without any detrimental toxic effect on the plant. Other objects of this invention and its commercial importance will be more fully appreciated from the detailed description, the drawing and claims which follow.

According to the invention, we have provided a practical, economical and commercially feasible solution for enhancing survival, health and growth of transplanted young plants, particularly forest seedlings, by applying in a single application to a planting hole, at the time of planting such seedlings, a special unitary fertilizer product comprising essentially at least one plant nutrient selected from the group consisting of urea formaldehyde compounds and phosphorus-containing compounds. The fertilizer product is further characterized by containing sufficient amounts of nutrients in a concentration nontoxic to the plants so as to release them slowly and gradually in the soil and make them available during at least the first full growing season of a plant after it has been transplanted from a nursery to a forest site.

It will be understood, however, that although the primary object of this invention is to provide means for ensuring survival and healthy growth of young forest trees during their critical early growth period, the utility of the fertilizer products of this invention is not limited to that particular object. Such products may be employed in the planting of other trees, such as shade, orchard, windbreak and landscaping, as well as shrubs, bushes, garden plants and the like.

In accordance with the present invention, the unitary fertilizer product is produced by preparing a finely divided mass comprising essentially at least one nutrient constituent selected from the group consisting of a certain type of urea-formaldehyde compounds and phosphorus-containing compounds. The mass is then compressed in a suitable apparatus into unitary products of predetermined, substantially uniform size corresponding to a weight in the range of from 1 to 30 grams, preferably from 5 to 20 grams per unitary product. The resulting fertilizer product contains sufficient amount of nutrient in a highly concentrated but slowly soluble form and it may be placed quickly and conveniently at the bottom of a planting hole at the time of transplanting a seedling. Also, the amount of the nutrient contained in each product will be sufficient to last for at least one full growing season of the seedling and the rate of release of the nutrient will be such as to avoid any toxic effect on the seedling even though the fertilizer product is placed adjacent the roots thereof.

The urea-formaldehyde compound, which is one of the two essential ingredients of the fertilizer product is the product resulting from the reaction of urea and formaldehyde in a ratio of from 1 to 5 mols, preferably from 1.5 to 3 mols, of urea per mol of formaldehyde. Such compounds are currently being marketed as agricultural fertilizers and contain about 20–42% nitrogen, more frequently about 30–40%, the major portion of which, in many cases 70–80%, is in the slowly available form, generally referred to as water-insoluble nitrogen. The water-insoluble nitrogen, as defined hereinabove, is slowly released from the unitary fertilizer product and thus it is available as plant food at a uniform rate and in small doses throughout at least one growing season, instead of being available in the soil in large quantities over a short period of time as in the case of soluble nitrogenous fertilizers. The final resistant remnants may last for years. The remaining proportion of the nitrogen is in the form of unreacted urea and urea-formaldehyde polymers of low molecular weight. These substances become available to the plant quite rapidly, usually during the first month in the soil, particularly if applied to the soil in form of a loose, granulated fertilizer, as opposed to the compact and compressed form thereof according to the present invention. There are several known methods of preparing urea-formaldehyde compounds suitable in the practice of our invention. Some of the satisfactory methods are described by Clark et al., Ind. & Eng. Chem. 40, 1178–83 (1948); Kralovec et al., U.S. Patent No. 2,592,809, April 15, 1952; and Darden, U.S. Patent No. 2,766,283, October 9, 1956.

The other essential constituent of the unitary fertilizer product of this invention, namely the phosphorus-containing compound, may be any one of the known or commercially available materials. Examplary of these are superphosphates (including triple superphosphates), phosphate rock, phosphoric acid and non-toxic salts thereof, for example calcium, magnesium or ammonium salts, and mixtures of various phosphatic compounds. The phosphorus content in any of the foregoing compounds is usually in the range of from 5% to 75%, preferably from 10% to 50%, expressed as $P_2O_5$. Similarly to the urea-formaldehyde compounds described hereinabove, the phosphorus-containing compounds suitable in the practice of the present invention should be characterized by slow solubility rate and hence be capable of releasing phosphorus gradually when placed in the soil in the form of a compressed unitary product of this invention.

The finely divided mass containing one or both constituents described above in admixture may include optionally, as an auxiliary ingredient, a binding agent, such as methyl cellulose, starch, dextrine, alginates, sulfite spent liquor, or the like in an amount generally not higher than 5% by weight based on the dry weight of the mass. Also, a small quantity of water may be added to the mixture, if desired, primarily in order to disperse the binding agent.

Furthermore, other materials may be incorporated into the fertilizer products, if desired. Such materials may include various trace elements useful to plant growth, such as compounds of iron, zinc, copper and the like; and wildlife repellents, such as tetramine or "Systox," capable of being assimilated systemically by the plant. These materials used either singly or in combination may be added in asmall quantity, generally not exceeding about 10% by weight, based on the dry weight of the mass. It will be understood by those skilled in the art that the quantity or concentration of such materials in each unitary product of this invention must be so calculated as to avoid any toxic effect or injury to the growing plant. The mass is simply mixed in a suitable mixing device and then fed to any suitable type of apparatus capable of compressing the same under such conditions as to produce unitary fertilizer products of predetermined weight as specified hereinabove. Although the size and shape of the unitary products are not critical, we prefer to produce small cylinders of approximately ¾ to 1½ inch in diameter and from about ¼ to about 2 inches high, the size being governed by the desired weight of each product. Due to inherent characteristics of the ingredients employed in the manufacture of the products of this invention, addition of inert fillers, such as cement, gypsum, basaltic rock, clay and the like is unnecessary and undesirable and thus it is not contemplated in the practice of this invention.

As mentioned hereinabove, the fertilizer products of this invention may be produced from a mass containing, as essential ingredients, either the urea-formaldehyde compound or the phosphorus-containing compound or a mixture of the two ingredients. When a mixture is employed, the relative proportions of the two ingredients may be varied to suit contemplated ultimate applications of the fertilizer. However, for a well-balanced fertilizer product, we prefer to use a mixture containing from 50–90% of urea-formaldehyde compound and from 10–50% of phosphorus-containing compound, by weight, respectively.

The unitary fertilizer products are employed advantageously in fertilizing forest soil by applying a product of selected weight and composition below the soil surface adjacent the roots of a young forest plant at the time of transplanting such plant from the nursery to the forest site. One unitary product per plant should suffice in most instances. The application may be accomplished manually or mechanically by means of a suitable device attached to a tree planting machine and synchronized with the planting of young trees.

The presently described fertilizer products and the method of thier preparation and application are further illustrated in the following examples wherein proportions of the constituents are given in percentages by weight, dry basis.

EXAMPLE 1

| | Percent |
|---|---|
| Urea-formaldehyde compound | 75 |
| Phosphorus-containing compound | 25 |

The urea-formaldehyde compound was in form of dry, free-flowing granules having a particle size 100% through 6 mesh and less than 2% through 80 mesh and produced by reacting in acidic medium urea and formaldehyde in a molar ratio of 1.6:1, respectively. It contained 38.5% nitrogen, and had an activity index of 55. The phosphorous-containing compound was commercially available superphosphate containing 18.3% available phosphorous as $P_2O_5$. Both ingredients were mixed in a conventional mixer and the resulting mass was fed into a pelleting apparatus adjusted to compress the mass into unitary, cylindrical products 1¼ inch in length and ¾ inch in diameter and weighing 15 grams each. Each product contained 28.8% nitrogen and 4.6% available $P_2O_5$.

These unitary fertilizer products were applied by a standard planting procedure at a forest tree farm where 256 Douglas fir seedlings grown for 2 years in a nursery bed were transplanted. One-half of this amount was planted with one fertilizer product being placed at the bottom of a planting hole adjacent the roots of a seedling, the other half was planted without the fertilizer product, as a control.

The planted seedlings were examined twice after the first and the second full growing season, i.e. after 6 months and 18 months after planting, respectively. The examination of the young trees included measurements of terminal growth, health and survival. In addition, a certain proportion of the unitary fertilizer products was also examined.

The results as given in Table 1 hereinbelow are average figures of all trees planted.

Table 1

|  | Control seedlings, inches | Terminal growth | |
|---|---|---|---|
|  |  | Fertilized seedlings | |
|  |  | Inches | Percent increase |
| After 1st growing season | 3.0 | 4.7 | 57 |
| After 2nd growing season | 11.2 | 15.6 | 39 |

The above results indicate that a marked increase in terminal growth occurred after each growing season in regard to the fertilized seedlings, as compared to the untreated controls. Furthermore, the fertilized young trees were considerably healthier than the untreated ones, as indicated by their deeper green color, greater needle length, better lateral development and larger bud formation. The non-toxic characteristics of the unitary fertilizer products were evidenced by substantially complete survival of the treated trees after two full growing seasons.

The examination of the fertilizer products after the first growing season has indicated that, in average, about ⅔ of their initial weight remained intact, thus leaving this amount available to the plants for their future use.

EXAMPLE 2

Percent
Urea-formaldehyde compound _____ 75
Phosphorus-containing compound _____ 25

The mixture was prepared by dissolving 7.5 pounds of urea in 5 liters of water at 25° C., adding thereto, as the phosphorus-containing compound, 2.9 pounds of 85% phosphoric acid, then adding quickly with constant stirring 6.8 pounds of 37% formaldehyde solution. This corresponded to urea-formaldehyde molar ratio of 1.5:1, respectively. The mixture was stirred until it became thick and then allowed to stand for 2 hours after which time it became a solid mass. The mass was first dried at 105° C. for 16 hours and then heated at 130° C. for 48 hours. The dried and cured mass was converted into unitary products weighing 15 grams each in the manner described in Example 1. Each product contained 28.4% nitrogen and 20% $P_2O_5$.

The resulting fertilizer products were applied to another group of young Douglas fir trees and in the same manner as described in Example 1.

The results are shown in Table 2 hereinbelow.

Table 2

|  | Control seedlings, inches | Terminal growth | |
|---|---|---|---|
|  |  | Fertilized seedlings | |
|  |  | Inches | Percent increase |
| After 1st growing season | 3.0 | 4.2 | 40 |
| After 2nd growing season | 11.2 | 13.6 | 21 |

The above data indicate the beneficial effect of the unitary fertilizers on the growth of young forest trees. The health, vigor and survival of the treated trees were essentially the same as those of treated trees of Example 1. Also, about ⅔ of each fertilizer product was unused after the first growing season.

EXAMPLE 3

The fertilizer composition described in Example 1 was applied at the time of transplanting a number of 2-year old hybrid pine (Monterey X Knobcone) seedlings in two forest sites. However, in addition to the untreated controls and seedlings planted with unitary products of this invention weighing 15 grams each, seedlings were also planted applying in the planting hole 15 grams of the same composition in the form of a free-flowing powder.

The results are given in Table 3 hereinbelow:

Table 3

|  | Control seedlings, inches | Terminal growth | | | |
|---|---|---|---|---|---|
|  |  | Fertilized seedlings | | | |
|  |  | Powder | | Unitary product | |
|  |  | Inches | Percent increase | Inches | Percent increase |
| After 1st growing season | 5.6 | 6 | 7 |  |  |
|  | 3.7 |  |  | 5.7 | 54 |

The above data indicate that the fertilizing composition applied in the form of a compressed, unitary product was significantly more effective in enhancing growth of a young tree, as compared to the same composition used in the same amount but in the form of a free-flowing powder. Although the difference in the effectiveness between the two forms of the fertilizers is not fully ascertained, it is believed that the nutrients present in the powdered fertilizer are removed therefrom in the soil relatively rapidly, whereas the compressed fertilizer product retains the nutrients and releases them slowly and uniformly over a long period of time.

EXAMPLE 4

Percent
Urea-formaldehyde compound _____ 100

This compound was prepared by dissolving 7.5 pounds of urea in 25 liters of water at about 25° C., and adding thereto, as an acidic catalyst, 0.1 pound of concentrated HCl and 6.8 pounds of 37% formaldehyde. This corresponded to a ratio of 1.5 mol urea to 1 mol formaldehyde. The solution was heated to 80° C. with stirring until a precipitate was formed, then allowed to stand for 2 hours. The precipitate urea-formaldehyde reaction product was then filtered off, dried at 105° C. and heated at 130° C. for 48 hours. The dried compound was formed into unitary products weighing 11.5 grams each and containing 38.5% nitrogen.

The resulting unitary products were applied to a group of young Douglas fir trees in the same manner as described in Example 1.

The results obtained are given in Table 4.

Table 4

|  | Control trees, inches | Terminal growth | |
|---|---|---|---|
|  |  | Fertilized trees | |
|  |  | Inches | Percent increase |
| After 1st growing season | 3.0 | 3.8 | 27 |
| After 2nd growing season | 11.2 | 13.3 | 19 |

The health and vigor of treated trees were markedly superior to those of untreated controls. There was a substantial proportion of the fertilizer unused at the end of the first growing season.

EXAMPLE 5

Percent
Phosphorus-containing compound _____ 100

Commercial, granulated, free-flowing superphosphate having a $P_2O_5$ content of 18% was converted into unitary compressed products according to the procedure of Example 1. Each product weighed 5 grams.

The unitary fertilizer products thus produced were applied to a number of Monterey pine seedlings grown in a nursery bed at the time of their transplanting into a forest site.

The results obtained are shown in Table 5 hereinbelow.

Table 5

| | Terminal growth | | |
|---|---|---|---|
| | Control seedlings, inches | Fertilized seedlings | |
| | | Inches | Percent increase |
| After 1st growing season | 3.8 | 5.4 | 42 |

As in the preceding field tests, the fertilized seedlings had a markedly healthier appearance than the untreated seedlings.

The following examples illustrate additional unitary fertilizer products suitable in the practice of this invention.

EXAMPLE 6

| | Percent |
|---|---|
| Urea-formaldehyde compound | 25 |
| Phosphorous-containing compound | 75 |

The urea-formaldehyde compound is a free-flowing granulated product produced by reacting 4 mols of urea and 1 mol of formaldehyde. It contains 39.5% nitrogen. The phosphorus-containing compound is a commercially available triple superphosphate containing 43% $P_2O_5$.

The constituents are processed in the manner described in Example 1 to form unitary products each weighing 2 grams and containing 9.9% nitrogen and 32.2% $P_2O_5$.

EXAMPLE 7

| | Percent |
|---|---|
| Urea-formaldehyde compound | 85 |
| Phosphorus-containing compound | 12 |
| Binding agent | 3 |

The urea-formaldehyde compound is the reaction product of 1.2 mol urea to 1 mol formaldehyde, containing 36% nitrogen. The phosphorus-containing compound is dibasic calcium phosphate containing 52.4% $P_2O_5$. The binding agent is methyl cellulose available commercially under the trademark "Methocel." The foregoing mass is formed in unitary products in the same manner as described in Example 1, each product weighing 25 grams and containing 30.6% nitrogen and 5.7% $P_2O_5$.

From the foregoing it will be apparent that by the presently described invention we have developed a unitary fertilizer product characterized by many advantageous properties. It is versatile, being applicable to a wide variety of young forest trees as well as to many types of other young plants without causing any injury thereto. Its content of slowly releasable in the soil nutrients highly desirable to promote survival, growth and health of seedlings is sufficient to insure adequate supply of the nutrients during at least one full growing season of a transplanted young plant. Its weight and size are most advantageously adapted for easy and convenient handling, transportation and placing in planting holes by the tree planters without requiring special efforts of weighing or measuring desirable quantities of fertilizers if used in free-flowing form.

All these and other advantages are obtained, furthermore, using a product which is very low in cost and which may be applied on a commercial scale by an economically feasible method of fertilizing forest soils in which young trees are transplanted.

It will be understood by those skilled in the art that modifications and variations may be effected without departing from the scope of the novel concepts of the present invention.

Having described our invention in preferred embodiments, we claim:

1. A unitary fertilizer product adapted for use in forest fertilization, said product containing sufficient nutrient in a highly concentrated but slowly soluble form and being capable of releasing gradually in the soil sufficient amount of nutrient to enhance survival, health, and growth of a transplanted young plant during at least the first growing season thereof, said product weighing from 1 to 30 grams and consisting essentially of at least one plant nutrient selected from the group consisting of (1) urea-formaldehyde compounds produced by reacting from 1 to 5 mols of urea with 1 mol of formaldehyde and containing from 20% to 42% nitrogen, and (2) phosphorus-containing compounds containing from 5% to 75% phosphorus at $P_2O_5$.

2. The product of claim 1, weighing from 5 to 20 grams.

3. The unitary fertilizer product adapted for use in forest fertilization, said product containing nutrients specifically proportioned to insure a slow and gradual release thereof in the soil to enhance survival, health and growth of a transplanted tree seedling during at least the first growing season thereof, said product weighing from 1 to 30 grams and consisting essentially of a nutrient mixture of (1) a urea-formaldehyde compound resulting from the reaction of from 1 to 5 mols of urea with 1 mol of formaldehyde and containing from 20% to 42% nitrogen and (2) a phosphorus-containing compound containing from 5% to 75% of phosphorus as $P_2O_5$.

4. The product of claim 3, wherein the mixture contains from 50% to 90% by weight of the urea-formaldehyde compound and from 10% to 50% of the phosphorus-containing compound.

5. The product of claim 3, wherein the phosphorus-containing compound is superphosphate.

6. The process of manufacturing fertilizer adapted for use in forest fertilization and containing sufficient nutrient in a highly concentrated but slowly soluble form for a gradual release thereof in the soil during at least one full growing season of a transplanted tree seedling, which process comprises preparing a finely divided mass consisting essentially of at least one plant nutrient selected from the group consisting of (1) urea-formaldehyde compound produced by reacting from 1 to 5 mols of urea with 1 mol of formaldehyde and containing from 20% to 42% nitrogen and (2) a phosphorus-containing compound containing from 5% to 75% phosphorus as $P_2O_5$, and compressing said mass into unitary products of substantially uniform size, each of said unitary products weighing from 1 to 30 grams.

7. A process of manufacturing fertilizer adapted for use in promoting survival, health, and growth of transplanted forest seedlings and containing a specifically proportioned amount of nutrient sufficient to last for at least one full growing season of such seedlings, which process comprises preparing a finely divided mixture consisting essentially of (1) from 50% to 90% by weight of a urea-formaldehyde compound resulting from the reaction of from 1 to 5 mols of urea with 1 mol of formaldehyde and containing from 20% to 42% nitrogen and (2) from 10% to 50% by weight of a phosphorus-containing compound containing from 5% to 75% phosphorus as $P_2O_5$; and compressing said mixture into unitary products of substantially uniform size, each of said unitary products weighing from 1 to 30 grams.

8. A process of enhancing survival, health and growth of a transplanted young forest plant which comprises incorporating into planting hole, at the time of transplanting such plant into the forest, a unitary fertilizer product containing sufficient nutrient to insure a slow and gradual release thereof in the soil adjacent the roots of a transplanted plant for at least the first full growing season of said plant, said product weighing from 1 to 30 grams and consisting essentially of at least one plant nutrient selected from the group consisting of (1) urea-formaldehyde compounds produced by reacting from 1 to 5 mols of urea with 1 mol of formaldehyde and containing from 20% to 42% nitrogen and (2) phosphorus-containing compounds containing from 5% to 75% phosphorus as $P_2O_5$.

9. The process of claim 8, wherein said product comprises a mixture of a urea-formaldehyde compound and a phosphorus-containing compound.

10. The process of claim 9, wherein said mixture is composed of 50% to 90% by weight of the urea-formaldehyde compound and 10% to 50% by weight of the phosphorus containing compound.

References Cited in the file of this patent

UNITED STATES PATENTS

| | | |
|---|---|---|
| 1,988,307 | Fay | Jan. 15, 1935 |
| 2,117,808 | Jones | May 17, 1938 |
| 2,502,996 | Rohner | Apr. 4, 1950 |
| 2,680,680 | Coleman | June 8, 1954 |
| 2,766,283 | Darden | Oct. 9, 1956 |
| 2,827,368 | Mortenson et al. | Mar. 18, 1958 |
| 2,864,685 | Waters et al. | Dec. 16, 1958 |
| 2,869,998 | Vierling | Jan. 20, 1959 |

FOREIGN PATENTS

| | | |
|---|---|---|
| 21,143 | Great Britain | Nov. 3, 1894 |